(12) United States Patent
Dunne (10) Patent No.: US 11,914,077 B2
(45) Date of Patent: Feb. 27, 2024

(54) SYSTEM AND METHOD FOR DETERMINATION OF ORIGIN DISPLACEMENT FOR A LASER RANGEFINDING INSTRUMENT

(71) Applicants: Laser Technology, Inc., Centennial, CO (US); Kama-Tech (HK) Limited, Hong Kong (CN)

(72) Inventor: Jeremy G. Dunne, Parker, CO (US)

(73) Assignees: Laser Technology, Inc., Centennial, CO (US); Kama-Tech (HK) Limited, Hong Kong (CN)

( * ) Notice: Subject to any disclaimer, the term of this patent is extended or adjusted under 35 U.S.C. 154(b) by 787 days.

(21) Appl. No.: 15/998,512

(22) Filed: Aug. 16, 2018

(65) Prior Publication Data

US 2019/0072653 A1 Mar. 7, 2019

Related U.S. Application Data

(60) Provisional application No. 62/546,433, filed on Aug. 16, 2017.

(51) Int. Cl.
| | |
|---|---|
| *G01S 7/48* | (2006.01) |
| *G01S 7/497* | (2006.01) |
| *G01S 17/86* | (2020.01) |
| *G01C 15/00* | (2006.01) |
| *G01S 7/51* | (2006.01) |
| *G01S 17/10* | (2020.01) |

(52) U.S. Cl.
CPC ............ *G01S 7/497* (2013.01); *G01C 15/004* (2013.01); *G01S 7/4808* (2013.01); *G01S 7/51* (2013.01); *G01S 17/10* (2013.01); *G01S 17/86* (2020.01)

(58) Field of Classification Search
CPC ... G01S 7/003; G01S 7/04; G01S 7/06; G01S 7/50–51; G01S 7/484; G01S 7/497; G01S 7/486; G01S 7/4808; G01S 7/4811; G01S 7/4815; G01S 17/06; G01S 17/10; G01S 17/42; G01S 17/86; G01S 19/40; G06T 7/70; G02B 30/00; H02J 50/30; H02J 50/90
USPC ....................................................... 356/5.01
See application file for complete search history.

(56) References Cited

U.S. PATENT DOCUMENTS

| | | | | |
|---|---|---|---|---|
| 5,291,262 A | * | 3/1994 | Dunne .................... | G01S 17/14 356/5.06 |
| 6,057,777 A | * | 5/2000 | Dunne .................... | B66C 13/46 212/276 |

(Continued)

FOREIGN PATENT DOCUMENTS

DE 102017212371 A1 * 1/2019 ......... G06K 9/00201

OTHER PUBLICATIONS

International Search Report and Written Opinion dated Nov. 28, 2018 in related PCT Application No. PCT/US18/00216.

*Primary Examiner* — James R Hulka
(74) *Attorney, Agent, or Firm* — William J. Kubida; Hogan Lovells US LLP (57) ABSTRACT

A system and method for determination of origin displacement for a laser rangefinding instrument which comprises laser transmitting and receiving sections coupled to a processor section. The processor section is configured to calculate ranges from the instrument to first and second target coordinates and to compensate for displacement between disparate first and second origin points in order to determine a distance between these target coordinates.

20 Claims, 4 Drawing Sheets

(56) References Cited

U.S. PATENT DOCUMENTS

| | | | | |
|---|---|---|---|---|
| 6,144,308 A * | 11/2000 | Dunne | G01C 9/20 | 340/429 |
| 6,377,186 B1 * | 4/2002 | Dunne | B66C 13/46 | 340/3.43 |
| 7,184,088 B1 * | 2/2007 | Ball | H04N 5/232 | 348/348 |
| 7,519,502 B1 * | 4/2009 | Carneal | G01B 11/30 | 702/167 |
| 7,796,782 B1 * | 9/2010 | Motamedi | G01C 1/00 | 382/106 |
| 8,275,544 B1 * | 9/2012 | Wells | G01S 17/86 | 701/501 |
| 8,452,569 B2 * | 5/2013 | Brown | F41G 7/001 | 702/181 |
| 8,842,261 B2 * | 9/2014 | Frucht | G08B 13/183 | 356/4.01 |
| 9,958,546 B2 * | 5/2018 | Setono | G01S 7/497 | |
| 2002/0060784 A1 * | 5/2002 | Pack | G01S 17/89 | 356/6 |
| 2007/0137091 A1 * | 6/2007 | Cross | F41G 1/473 | 42/142 |
| 2010/0302527 A1 * | 12/2010 | Gogolla | G01S 17/08 | 356/4.01 |
| 2012/0176593 A1 * | 7/2012 | Frucht | G01S 17/10 | 356/4.01 |
| 2015/0057028 A1 * | 2/2015 | Rudow | H04W 4/026 | 455/456.3 |
| 2015/0078123 A1 * | 3/2015 | Batcheller | G01S 15/86 | 367/7 |
| 2015/0116481 A1 * | 4/2015 | Troy | B64F 5/60 | 348/128 |
| 2015/0166060 A1 * | 6/2015 | Smith | G01S 15/88 | 701/23 |
| 2016/0003945 A1 * | 1/2016 | Setono | G01S 7/4817 | 356/5.01 |
| 2016/0245646 A1 * | 8/2016 | Hart | G01S 13/865 | |
| 2016/0252619 A1 * | 9/2016 | Markendorf | G01S 17/66 | 356/3.01 |
| 2016/0292312 A1 * | 10/2016 | Saha | G06Q 40/00 | |
| 2019/0072653 A1 * | 3/2019 | Dunne | G01S 17/10 | |

* cited by examiner

SYSTEM AND METHOD FOR DETERMINATION OF ORIGIN DISPLACEMENT FOR A LASER RANGEFINDING INSTRUMENT

CROSS REFERENCE TO RELATED PATENT APPLICATIONS

The present invention is related to, and claims priority from U.S. Provisional Patent Application Ser. No. 62/546,433 filed on Aug. 16, 2017, the disclosure of which is herein specifically incorporated by this reference in its entirety. The present invention is also related to the subject matter disclosed in U.S. patent application Ser. No. 14/524,900 filed Oct. 27, 2014 for: "Pseudo-Stabilization Technique for Laser-Based Rangefinding Instruments Utilizing a Rate Gyroscope to Track Pitch and Yaw Deviations from the Aiming Point" assigned to the assignees of the present invention, the disclosure of which is herein specifically incorporated by this reference in its entirety.

BACKGROUND OF THE INVENTION

The present invention relates, in general, to the field of laser rangefinding instruments and methods for utilizing the same. More particularly, the present invention relates to a system and method for determination of origin displacement for a laser rangefinding instrument.

Laser Technology, Inc., assignee of the present invention, designs, manufactures and distributes laser rangefinding instruments which calculate distance by measuring the time of flight of very short pulses of eye-safe infrared light. Any solid object will reflect back a certain percentage of the emitted light energy to the instrument. This need only be a small percentage for a sensitive detector to pick it up and a measurement then made with a precision time base as to the time it takes for the laser pulses to travel to the target and back. Given knowledge of the constant speed of light, the distance the laser pulses have traveled can then be calculated.

In order to increase accuracy, such laser rangefinders are designed to process multiple pulses in a single measurement period, with target acquisition times typically ranging from 0.3 to 0.7 seconds. Sophisticated accuracy validation algorithms are then utilized to ensure reliable distance measurements and eliminate spurious signals due to noise and other factors.

Laser Technology, Inc. has pioneered and developed the design and measurement functionality found in some of the most popular lines of rangefinders and speed measurement instruments currently available on the market. Representative of its proprietary technology is that disclosed in U.S. Pat. Nos. 5,574,552; 5,612,779; 5,652,651; 5,703,678; 5,880,821; 5,926,260; 6,057,910; 6,226,077 and 6,445,444 the disclosures of which are herein specifically incorporated by this reference in their entirety.

Current laser rangefinders, such as the TruPulse® series of laser rangefinders available from Laser Technology, Inc. incorporate inclinometers (or tilt sensors) and have the capability to enable measurement of a what is known as a two dimensional (2D) missing line. This is the calculated value between two remote points within the same plane determined by measuring the slope distance and inclination to each targeted point.

Other instruments in the TruPulse series may also incorporate magnetic sensors and accelerometers and have the capability to enable measurement of what is known as a three dimensional (3D) missing line. This is the calculated value between two remote points that is determined by measuring the slope distance, inclination and azimuth value to each targeted point. Such instruments can also be utilized to determine, for example, the area of a building roof by targeting three or more points at the corners of a rectangular roof. The incorporation of magnetic sensors and/or accelerometers in laser rangefinding instruments is disclosed, for example, in U.S. Pat. No. 8,240,186 issuing to Laser Technology, Inc. on Aug. 14, 2012, the disclosure of which is also herein incorporated by this reference in its entirety.

In order for the values of the measured slope distance, inclination and azimuth values to be accurate in the determination of the 2D or 3D missing line calculations previously described, it has heretofore been necessary that the rangefinding instrument be mounted on a tripod or otherwise fixed about a pivot point such that the origin point is the same for each measurement shot. This has effectively precluded the use of a laser rangefinder in a handheld mode of operation due to the vagaries inherent in a user's lateral and vertical positioning of the device between measurements.

For this reason, it would be highly advantageous to provide a system and method for determination of origin displacement for a laser rangefinding instrument.

SUMMARY OF THE INVENTION

Particularly disclosed herein is a rangefinding instrument which comprises a laser transmitting section for transmitting laser energy to first and second target coordinates from respectively disparate first and second origin points. The instrument further comprises a laser energy receiving section for receiving laser energy reflected back to the instrument from the first and second target coordinates. A processor section is coupled to the laser transmitting and laser energy receiving sections for calculating ranges from the instrument to the first and second target coordinates, with the processor section being configured to compensate for displacement between the disparate first and second origin points and determine a distance between the first and second target coordinates.

Also particularly disclosed herein is a rangefinding instrument which comprises a laser transmitting section for transmitting laser energy to first, second and third target coordinates from respectively disparate first, second and third origin points. The instrument further comprises a laser energy receiving section for receiving laser energy reflected back to the instrument from the first, second and third target coordinates. A processor section is coupled to the laser transmitting and laser energy receiving sections for calculating ranges from the instrument to the first, second and third target coordinates, with the processor section being configured to compensate for displacement between the disparate first, second and third origin points and determine a distance between the first, second and third target coordinates.

Further particularly disclosed herein is a method for remotely determining the distance between target coordinates. The method comprises determining a first range to a first target coordinate from a first origin point and further determining a second range to a second target coordinate from a second disparate origin point. The method compensates for a displacement between the first and second origin points and determines the distance between the first and second target coordinates based upon the compensated displacement. The compensation for the displacement may be carried out by determining lateral and vertical positioning differences between the first and second origin points.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A REPRESENTATIVE EMBODIMENT

Figure 1:
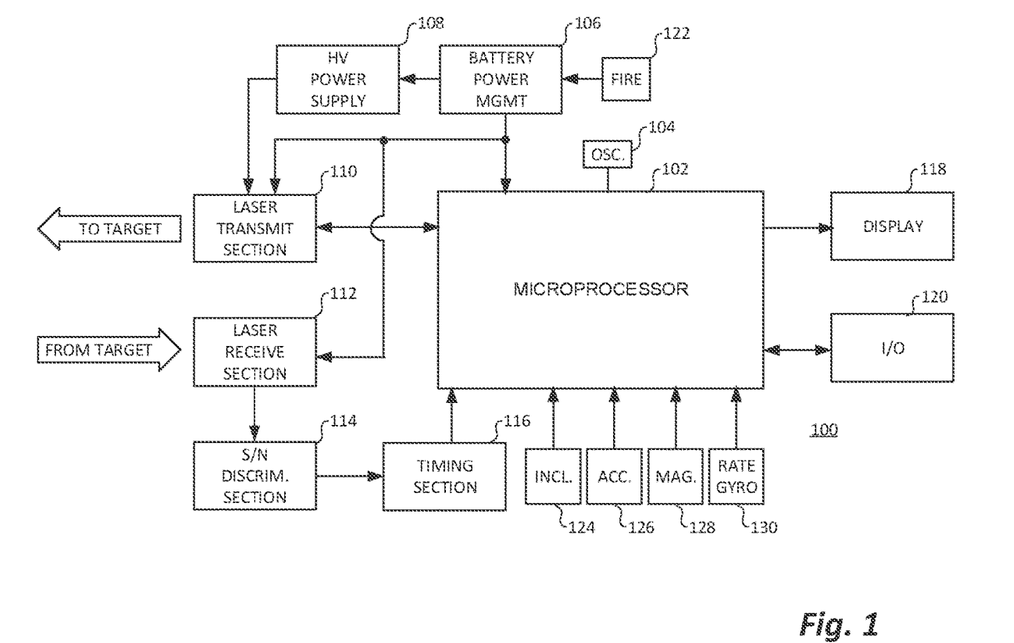
FIG. 1 is a representative functional block diagram of a laser rangefinding and speed instrument for possible incorporation of the system and method for determination of origin displacement of the present invention.

With reference now to FIG. 1, a representative functional block diagram of a laser rangefinding and speed instrument for possible incorporation of the system and method for determination of origin displacement of the present invention is shown.

The exemplary instrument 100 comprises a microprocessor 102 or central processing unit (CPU) with an associated oscillator 104 for providing clocking signals to the microprocessor 102. A battery and power management section 106 supplies operating power to the microprocessor 102 and various other instrument subsystems (not shown) as well as the high voltage (HV) power supply 108 which provides operating voltage to a laser transmit section 110 and associated laser diode as well as a laser receive section 112 and associated photodiode.

The laser receive section 112 receives a portion of the laser energy transmitted by the laser transmit section 110 as reflected by a target through a photodiode and provides the return signals to a signal/noise (S/N) discriminator section 114 in order to separate true return pulses from any associated noise. A timing section 116 accurately measures the time between the transmission of laser pulses from the laser transmit section 110 and the reception of the same target reflected pulses at the laser receive section 112 to determine, in conjunction with the microprocessor 102, the distance to the particular target towards which the instrument 100 is aimed. A fire button 122 is coupled to the battery and power management section 106 and is operable by a user of the instrument 100 in conjunction with the microprocessor 102 to determine when to emit pulses toward a target from the laser transmit section 110.

The instrument 100 may also incorporate a user viewable display 118, which may include a view of the target in conjunction with an aiming reticule as well as information regarding the range to the target, speed of the target, battery condition and other information. The display 118 may also comprise a touchscreen display to allow user inputs to the instrument 100 in conjunction with, or as an alternative to, an input/output (I/O) section 120. As also illustrated, the instrument 100 may further incorporate an inclinometer ("INCL" or tilt sensor) 124, and/or an accelerometer ("ACC") 126 and/or a magnetic sensor ("MAG" or compass) 128 and/or a rate gyroscope ("RATE GYRO") 130 and/or a global positioning system unit ("GPS") not shown.

The I/O section 120 may comprise a keypad or other means of communicating information to or from the microprocessor 102 including wired connections such as a universal serial bus (USB) and the like as well as wireless connections such as an IEEE 802.11 (WiFi), or other wireless local area network (WLAN) transceiver; a Bluetooth transceiver or other personal are network (PAN) system for wirelessly exchanging data over short distances; and/or another near field communication (NFC) transceiver (inclusive of infrared (IR) coupling) for wirelessly coupling the instrument 100 to external devices or data storage elements.

Figure 2:
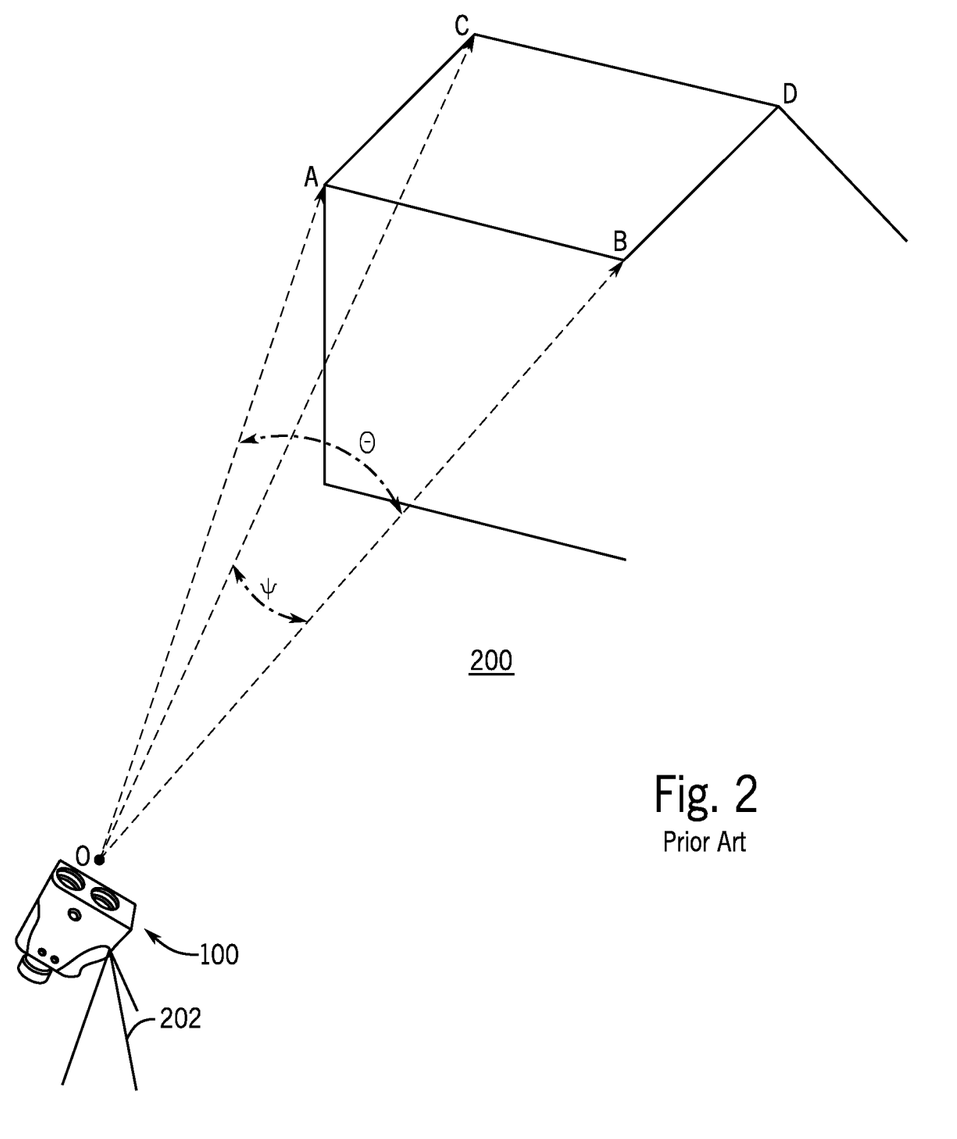
FIG. 2 is a simplified illustration of a prior art technique for determining, for example, the dimensions and/or area of the roof of a building utilizing a laser rangefinding instrument wherein the origin point "0" with respect to points "A", "B" and "C" must remain fixed to enable determination of the roof dimensions and/or area.

With reference additionally now to FIG. 2, a simplified illustration of a prior art technique 200 is shown for determining, for example, the dimensions and/or area of the roof of a building utilizing a laser rangefinding instrument 100 wherein the origin point "0" with respect to points "A", "B" and "C" must remain fixed to enable accurate determination of the roof dimensions and/or area.

As previously discussed, if the 3D missing line distance AB is to be determined, the slope distances OA and OB must be measured along with the inclination from point O to points A and B in addition to the azimuth value ⊖ between the vectors OA and OB as shown. Further, if the area of the roof ABCD is to be determined, the slope distance OC must also be measured along with the additional inclination and azimuth as represented by Ψ. For each of the slope distances, inclination and azimuth measurements to be accurate, it has been necessary that the laser rangefinding instrument 100 be physically pivoted about a fixed origin point O by means of a tripod 202 or other pivot point as shown.

Figure 3:
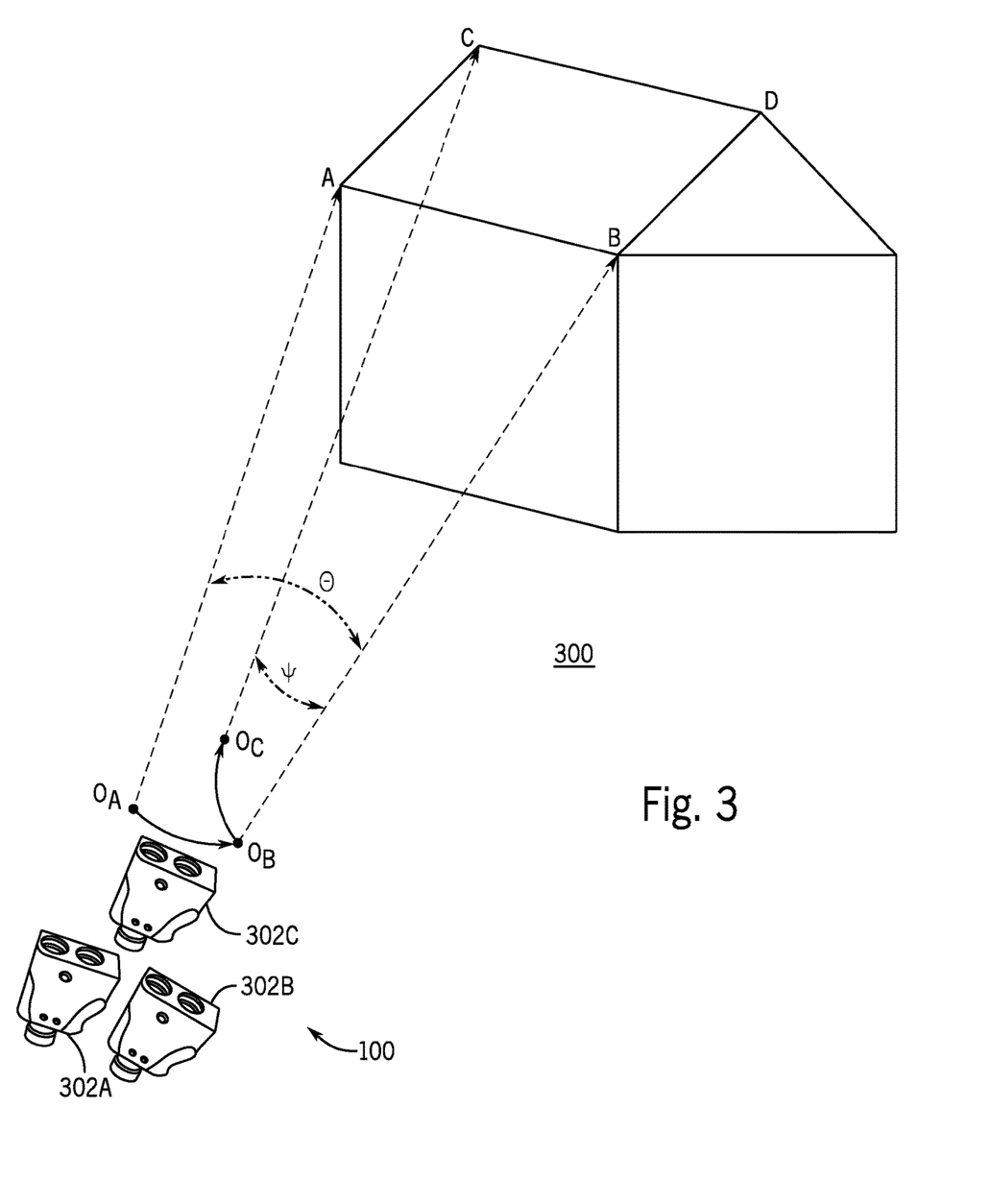
FIG. 3 is a corresponding simplified illustration of an exemplary implementation of the system and method for determination of origin displacement for a laser rangefinding instrument in accordance with the technique of the present invention wherein the origin points "$O_A$", "$O_B$" and "$O_C$" need not be coincident thereby enabling handheld utilization of the laser rangefinding instrument in the determination of the roof dimensions and/or area.

With reference additionally now to FIG. 3, a corresponding simplified illustration of an exemplary implementation 300 of the system and method for determination of origin displacement for a laser rangefinding instrument 100 in accordance with the technique of the present invention is shown. In accordance with the system and method of the present invention, the origin points "$O_A$", "$O_B$" and "$O_C$" need not be coincident thereby enabling handheld utilization of the laser rangefinding instrument 100 in the determination of the roof dimensions and/or area with the instrument 100 held at, for example, positions 302A, 302B and 302C as shown.

In this representative example of the system and method of the present invention, a first measurement of the slope distance from origin point $O_A$ to point A is made along with the inclination between the two points. A second measurement of the slope distance from the origin point $O_B$ to point B is then made along with the inclination between the two points and the azimuth ⊖ between this slope distance measurement and the preceding. If, for example, the area of the roof ABCD is to be determined, a subsequent measurement of the slope distance from the origin point $O_C$ to point C is then made along with the inclination between the two points and the azimuth Ψ between this slope distance measurement and the preceding.

In accordance with the system and method of the present invention, the points $O_A$, $O_B$ and $O_C$ need not be coincident to enable accurate 3D missing line or area determinations unlike the prior art technique illustrated in FIG. 2. Therefore, a handheld laser rangefinder can instead be utilized to account for the fact that the origin of each of the three slope measurements are not the same, thereby providing distinct advantages in actual day-to-day utilization of these instruments.

As previously described, one may utilize a laser rangefinding instrument 100 to determine the length, width or area of a wall, roof or the like at a remote distance. In operation, a distance measurement is made to a first corner, a next corner, a subsequent corner etc. Conventionally, the rangefinding instrument 100 would be mounted to a tripod 202 or other supporting structure such that the origin point is centered about an axis and is the same for all the measurements as shown in FIG. 2.

However, that is a less than expeditious way of determining the dimensions of a target structure and typically the laser rangefinding instrument 100 might be handheld wherein the operator must be very cognizant of how the instrument 100 is positioned in an attempt to ensure that the device remains in the same relative position; failing which an inaccurate calculation of the target dimensions is acquired.

Since that is very difficult to do in practice, it is highly desirable to provide a calculation within the microprocessor 102 of the laser rangefinding instrument 100 itself to determine the displacement of the origin point from the initial measurement to the second measurement, to the third measurement and the like. So in order to do that, and with reference now additionally to FIGS. 4 and 5, a system and method is disclosed herein which utilizes the accelerometer 126 that is currently implemented in tilt sensor mechanisms incorporated in laser rangefinding instruments 100. In this manner, an angle to the target is acquired from the static gravity vector by, for example, the accelerometer 126. When the instrument 100 is moved, the acceleration of the device is going to be added to the gravity vector. Therefore, when a measurement to point A is taken, then the accelerometer 126 data is now logged for the measurement plus this now becomes the starting point for subsequent measurements. Then, when the instrument 100 is moved to take a measurement to point B one can subtract out the gravity vector from the acceleration vector and then apply a double integral to the acceleration vector with the gravity vector removed such that the actual physical displacement of the laser rangefinding instrument can be calculated as will be described in more detail hereinafter.

That displacement can then be added to the target coordinate to provide an accurate distance to the target coordinate because two vectors then result. As shown previously with respect to FIG. 3, the starting point is origin $O_A$ then the instrument 100 is moved over to origin $O_B$ and then up to origin $O_C$. This results in a vector from origin $O_B$ minus origin $O_A$ which is then added to the second target coordinate to point B because, from the original motion, the instrument 100 has seen a displacement by horizontal angle ϴ. Since origin $O_B$ is now displaced from origin $O_A$ a true measure of the coordinate to point B does not result. (As also illustrated, Ψ is the angle from origin B to origin C).

The first measurement to point A provides the reference. If a compass sensor is utilized in the laser rangefinding instrument 100, this can be close to an absolute reference, or if a rate gyro 130 system is employed then this can just be the initial measurement using a known angle.

Having taken the initial measurement from origin $O_A$ and then the second measurement, if the instrument 100 is rotated about the same point with the concomitant change in angle and the change in range, the two angles and the two ranges provide the missing line which is basically the width of the roof line AB.

When the instrument 100 is not rotated about the same point and without compensation, the instrument 100 would measure the distance to point B as being shorter than it actually is by not allowing for the fact that the origin point has shifted. Therefore the computation of the present invention contemplates a differing origin $O_B$ and a target coordinate B so the distance to the target B vector is equal to the measured B vector plus the origin $O_B$ vector. In other words, origin $O_A$ is the starting point (0,0,0) in three dimensional space so as instrument 100 is moved, origin $O_B$ is now the origin for the new measurement followed by origin $O_C$ and so on. Therefore every time the instrument 100 position is changed, the actual target measurement is the measured value from the instrument 100 from the horizontal angle and the vertical angle and the range to the target plus the calculated origin shift as shown below.

$$\text{Target}\overline{A} \Rightarrow \overline{M}_A + \overline{O}_A$$

$$\text{Target}\overline{B} \Rightarrow \overline{M}_B + \overline{O}_B$$

$$\text{Target}\overline{C} \Rightarrow \overline{M}_C + \overline{O}_C$$

This shift can be vertically, horizontally, laterally and/or any type of movement.

If the instrument 100 is placed on so that it remains in the same orientation, the same acceleration vector may be used. However, there are real world situations that can present somewhat more complicated situations than that, such as when there is a pole in the way and a measurement is taken from one side and then the other. The technique of the present invention now affords an operator this additional freedom of operation even though in this situation the angle of the instrument 100 toward the target has changed significantly as well as its displacement.

In this instance, it is then advantageous to track the displacement of the instrument 100 in six axes, that is, track the changing angles as well as the changing acceleration. This can be done utilizing information from the rate gyro 130 with the first still measurement to the target (the acceleration vector is assumed to be that the instrument 100 is stationary) enabling the calculation of just the gravity vector. In the utilization of information from the rate gyro 130, one can assume that all three axes are stationary so that becomes the zero point for the three axes of the rate gyro 130. At this point, one can subtract the zero point and then convert it into an angle axis representation by simply taking the rate vectors divided by the magnitude axis and the root of the magnitude is the root of the sum of the squares of the vectors. This can be integrated using Simpson's Rule or simply a straight integration.

This can then be converted into a rotation matrix or Quaternian form which may be somewhat simpler. In this manner, the instantaneous rate angle can then be converted into an axis angle form or into a Quaternian form. And then, from the initial orientation of the instrument 100, the delta on every sample can be computed by consecutively multiplying the Quaternians. At any given time though, the sum total of the Quaternians can then be converted back to an actual orientation of the instrument 100 at the instant the accelerometers 126 are being sampled. This is what is desired since the accelerometer 126 vector will be changing not only in magnitude but also in the magnitude of its components which is then tracked by continuously calculating the rotation integral.

In the calculation of the actual inertial displacement of the instrument 100, the measured accelerometer 126 data is the measured data minus the gravity zero which is the stationary measurement. So as soon as a measurement is taken, this measurement is locked in. When the operator of the instrument 100 releases the fire button 122, the instrument 100 is then informed it is about to be repositioned and now the microprocessor 102 then takes those zero points and starts immediately computing the integral.

In practice, this can be effectuated as a double integral from the accelerometer 126 to the displacement and can be done with a relatively simple summation as follows or, alternatively, through a more complicated arrangement using Simpson's Rule.

$$\overline{S} = \sum_{t=0}^{N} \left[ \sum_{t=0}^{N} \frac{(\overline{a}_{N+1} + \overline{a}_N)}{2} \times (t_{N+1} - t_N) \right]_v \times (t_{N+1} - t_N)$$

Figure 4:
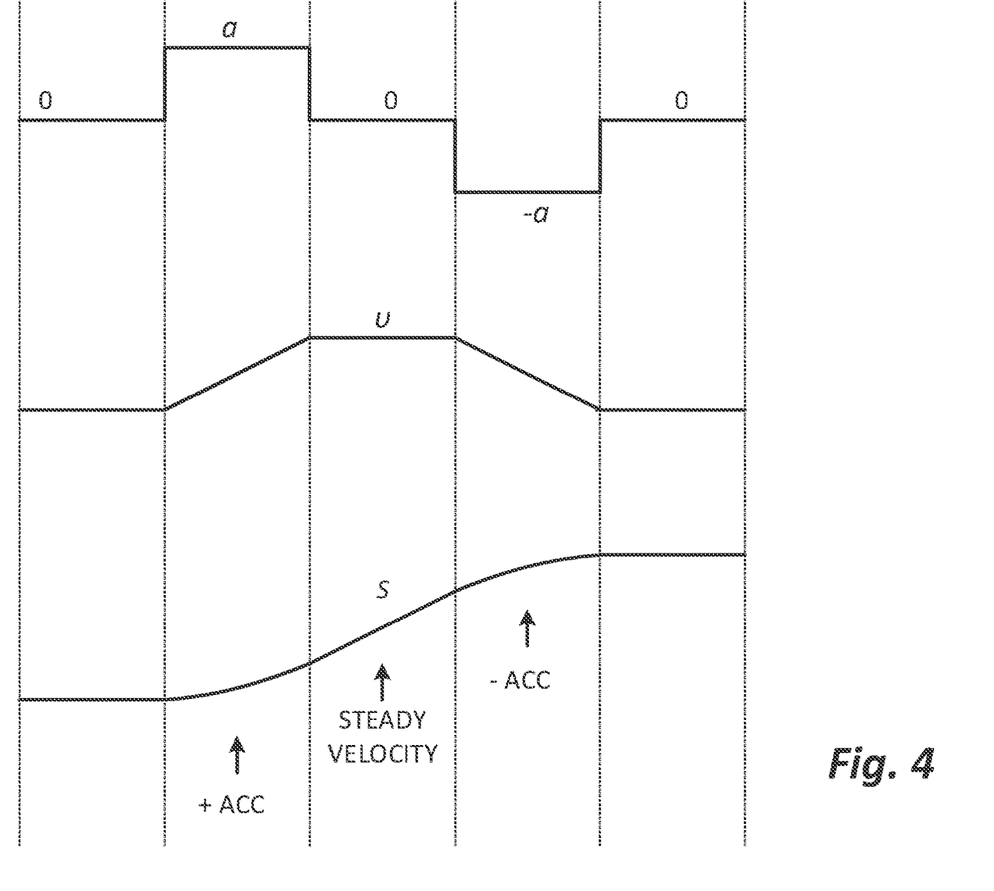
FIG. 4 is a set of exemplary waveforms illustrating the relationship between positive and negative acceleration, velocity and the displacement vector of the laser rangefinding instrument 100 as in FIG. 3.
Figure 5:
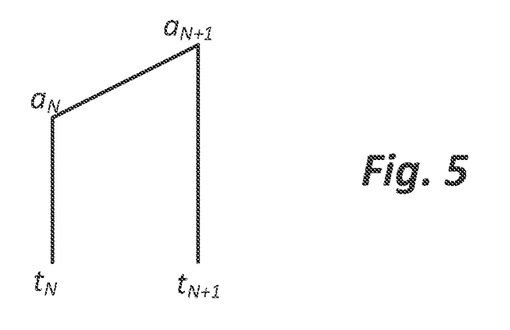
FIG. 5 is a simplified depiction of acceleration $a_N$ to $a_{N+1}$ during time sample $t_N$ to $t_{N+1}$ which provides the area under the curve representative of velocity during that time period.

In other words the acceleration is substantially $(a_{N+1} + a_N)/2$ at time sample $t_{N+1} - t_N$ which provides the area under that curve for that cell (c.f. FIG. 5). This becomes the velocity (the inner term is the velocity v indicated above) then the outer summation $(t_{N+1} - t_N)$ is multiplied to provide the displacement vector. So the summation of these trapezoids ends up with the displacement vector S (c.f. FIG. 4).

$$S = ut + \frac{1}{2}at^2$$

where u=0

So $a_N$ basically defines the coordinates and the measured acceleration is the active measurement $(X_{MN}, Y_{MN}, Z_{MN}$ as indicated below) minus the stationary measurement $(X_{M0}, Y_{M0}, Z_{M0})$. As there has been a significant rotation of the instrument 100, this instantaneous value has to be corrected back to the original earth coordinate frame $(X_{M0}, Y_{M0}, Z_{M0})$ using the rotation integral from the rate gyro 130.

$$\overline{a}_N = (\overline{a}_{MN} - \overline{a}_{M0}) \Rightarrow \begin{pmatrix} X_{MN} - X_{M0} \\ Y_{MN} - Y_{M0} \\ Z_{MN} - Z_{M0} \end{pmatrix}$$

$$\overline{a}_0 = \frac{1}{N+1} \sum_{t=0}^{N} \overline{a}_M \text{ at measurement}$$

The principles of the present invention are also applicable to tape lasers or any other handheld rangefinder device or instrument 100 wherein consecutive measurements are to be taken of various target points. As previously described, conventional devices would generally require that the device be mounted on a tripod 202 (FIG. 2), pivot or otherwise be mechanically centered or with a known given offset. Without a common center point of rotation, there is not even an intersection between vectors so the actual origin vector must be computed and then added to the target vector.

While there have been described above the principles of the present invention in conjunction with specific systems and methods, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

As used herein, the terms "comprises", "comprising", or any other variation thereof, are intended to cover a non-exclusive inclusion, such that a process, method, article, or apparatus that comprises a recitation of certain elements does not necessarily include only those elements but may include other elements not expressly recited or inherent to such process, method, article or apparatus. None of the description in the present application should be read as implying that any particular element, step, or function is an essential element which must be included in the claim scope and THE SCOPE OF THE PATENTED SUBJECT MATTER IS DEFINED ONLY BY THE CLAIMS AS ALLOWED. Moreover, none of the appended claims are intended to invoke paragraph six of 35 U.S.C. Sect. 112 unless the exact phrase "means for" is employed and is followed by a participle.

What is claimed is:

1. A hand holdable rangefinding instrument comprising:
   a laser transmitting section for transmitting laser energy to first and second mutually fixed in relationship target coordinates from respectively disparate first and second origin points;
   a laser energy receiving section for receiving laser energy reflected back to said instrument from said first and second target coordinates; and
   a processor section coupled to said laser transmitting and laser energy receiving sections for calculating ranges from said instrument to said first and second target coordinates, said processor section configured to compensate for displacement between said disparate first and second origin points in three dimensional space and determine a distance between said first and second target coordinates.

2. The rangefinding instrument of claim 1 wherein said laser transmitting section comprises a pulsed laser transmitter for emitting a series of laser pulses toward said first and second target coordinates.

3. The rangefinding instrument of claim 2 wherein said laser energy receiving section comprises a pulsed laser receiver for determining said ranges from said instrument to said first and second target coordinates based upon a time of flight of said series of laser pulses.

4. The rangefinding instrument of claim 1 wherein said processor section comprises a microprocessor in operative association with an accelerometer for determining said displacement between said disparate first and second origin points.

5. The rangefinding instrument of claim 1 wherein said processor section comprises a microprocessor in operative association with a compass sensor for determining said displacement between said disparate first and second origin points.

6. The rangefinding instrument of claim 1 wherein said processor section comprises a microprocessor in operative association with a rate gyro for determining said displacement between said disparate first and second origin points.

7. The rangefinding instrument of claim 1 further comprising:
a display coupled to said processor section for indicating said distance between said first and second target coordinates.

8. The rangefinding instrument of claim 7 wherein said display also indicates said calculated ranges.

9. The rangefinding instrument of claim 7 wherein said display also indicates said displacement between said disparate first and second origin points.

10. A hand holdable rangefinding instrument comprising:
a laser transmitting section for transmitting laser energy to first, second and third target mutually fixed in relationship coordinates from respectively disparate first, second and third origin points;
a laser energy receiving section for receiving laser energy reflected back to said instrument from said first, second and third target coordinates;
a processor section coupled to said laser transmitting and laser energy receiving sections for calculating ranges from said instrument to said first, second and third target coordinates, said processor section configured to compensate for displacement between said disparate first, second and third origin points in three dimensional space and determine a distance between said first, second and third target coordinates.

11. A method for remotely determining the distance between mutually fixed in relationship target coordinates utilizing a hand holdable rangefinding instrument, said method comprising:
determining a first range to a first target coordinate from a first origin point;
further determining a second range to a second target coordinate from a second disparate origin point;
compensating for a displacement between said first and second origin points in three dimensional space; and
determining said distance between said first and second target coordinates based upon said compensated displacement.

12. The method of claim 11 further comprising:
also determining a third range to a third target coordinate from a third disparate origin point;
additionally compensating for said displacement between said first, second and third origin points; and
additionally determining said distances between said first, second and third target coordinates based upon said additionally compensated displacement.

13. The method of claim 12 wherein said first, second and third ranges are determined by a laser rangefinding device.

14. The method of claim 12 wherein said step of compensating is carried out by determining lateral and vertical positioning differences between said first, second and third origin points.

15. The method of claim 12 further comprising:
displaying said distance between said first, second and third target coordinates.

16. The method of claim 12 further comprising:
calculating an area of a surface defined by said first, second and third target coordinates.

17. The method of claim 16 further comprising:
displaying said area of said surface.

18. The method of claim 11 wherein said first and second ranges are determined by a laser rangefinding device.

19. The method of claim 11 wherein said step of compensating is carried out by determining lateral and vertical positioning differences between said first and second origin points.

20. The method of claim 11 further comprising:
displaying said distance between said first and second target coordinates.

* * * * *